United States Patent
Marc

(10) Patent No.: US 11,891,979 B2
(45) Date of Patent: Feb. 6, 2024

(54) FLOATING WIND TURBINE WITH CONTROLLABLE YAW POSITION

(71) Applicant: EOLINK S.A.S., Plouzané (FR)

(72) Inventor: Guyot Marc, Plouzané (FR)

(*) Notice: Subject to any disclaimer, the term of this patent is extended or adjusted under 35 U.S.C. 154(b) by 231 days.

(21) Appl. No.: 17/278,391

(22) PCT Filed: Sep. 5, 2019

(86) PCT No.: PCT/EP2019/073752
§ 371 (c)(1),
(2) Date: Mar. 22, 2021

(87) PCT Pub. No.: WO2020/057997
PCT Pub. Date: Mar. 26, 2020

(65) Prior Publication Data
US 2021/0355911 A1 Nov. 18, 2021

(30) Foreign Application Priority Data
Sep. 20, 2018 (FR) ........................................ 1858540

(51) Int. Cl.
*F03D 7/02* (2006.01)
*F03D 13/25* (2016.01)
(Continued)

(52) U.S. Cl.
CPC ............ *F03D 7/0204* (2013.01); *B63B 21/50* (2013.01); *B63B 21/507* (2013.01); *B63B 35/44* (2013.01);
(Continued)

(58) Field of Classification Search
CPC .......... F03D 7/0204; F03D 13/25; F03D 7/02; B63B 21/50; B63B 21/507; B63B 35/44;
(Continued)

(56) References Cited

U.S. PATENT DOCUMENTS

| | | | |
|---|---|---|---|
| 6,918,346 B2* | 7/2005 | Grenier ................. | B63B 43/14 |
| | | | 114/102.16 |
| 8,197,208 B2 | 6/2012 | Sharples et al. | |

(Continued)

FOREIGN PATENT DOCUMENTS

| | | |
|---|---|---|
| DE | 19851735 A1 | 5/2000 |
| FR | 2967470 A1 | 5/2012 |

(Continued)

OTHER PUBLICATIONS

International Preliminary Report on Patentability for PCT/EP2019/073752, dated Mar. 23, 2021, pp. 1-8.

(Continued)

*Primary Examiner* — Anthony D Wiest

(57) ABSTRACT

The invention relates to a marine energy production assembly (1) comprising:
anchoring means (2);
a floating wind turbine (4) comprising a turbine (7) having a fixed axis of rotation (A-A) of a rotor (71) with respect to a floating structure (5) of the floating wind turbine (4),
means (8) for determining the wind direction (V);
characterised in that it comprises:
means (81) for detecting an orientation of the floating wind turbine (4) with respect to the wind direction (V);
means (9) for detecting an inclination of the floating wind turbine (4);
means (10) for controlling the inclination of the floating wind turbine (4);
a computation unit (11) for transmitting an instruction to the means (10) for controlling the inclination of the floating wind turbine (4) and altering the orientation of the floating wind turbine (4) with respect to the wind direction (V).

14 Claims, 4 Drawing Sheets

(51) Int. Cl.
    *B63B 21/50*     (2006.01)
    *B63B 35/44*     (2006.01)

(52) U.S. Cl.
    CPC ........ *F03D 13/25* (2016.05); *B63B 2035/446* (2013.01); *F05B 2240/93* (2013.01); *F05B 2240/95* (2013.01); *F05B 2270/321* (2013.01)

(58) Field of Classification Search
    CPC ... B63B 2035/446; B63B 39/02; B63B 39/03; F05B 2240/93; F05B 2240/95; F05B 2270/321; Y02E 10/72; Y02E 10/727
    See application file for complete search history.

(56) References Cited

U.S. PATENT DOCUMENTS

| | | |
|---|---|---|
| 8,668,455 B2 | 3/2014 | Finnell |
| 9,270,150 B2 | 2/2016 | Sharples et al. |
| 9,670,908 B2 | 6/2017 | Dupin De La Gueriviere |
| 9,976,540 B2 | 5/2018 | Guyot |
| 10,180,129 B2 * | 1/2019 | Couchman ................ F03D 7/02 |
| 2011/0037264 A1 * | 2/2011 | Roddier .................. B63B 35/44 |
| | | 290/55 |

FOREIGN PATENT DOCUMENTS

| | | | |
|---|---|---|---|
| FR | 3022880 A1 | 1/2016 | |
| WO | WO-2009067023 A1 * | 5/2009 | ............. F03D 11/04 |
| WO | 2012150623 A1 | 11/2012 | |

OTHER PUBLICATIONS

Adel Merabet, Jogengra Thongam, Jason Gu, Torque and Pitch Angle Control for Variable Speed Wind Turbines in All Operating Ranges, IEEE 2011 [retrieved on Jul. 8, 2023]. Retrieved from teh Internet:<https://www.researchgate.net/publication/252007209>.
English abstract for FR3022880.

* cited by examiner

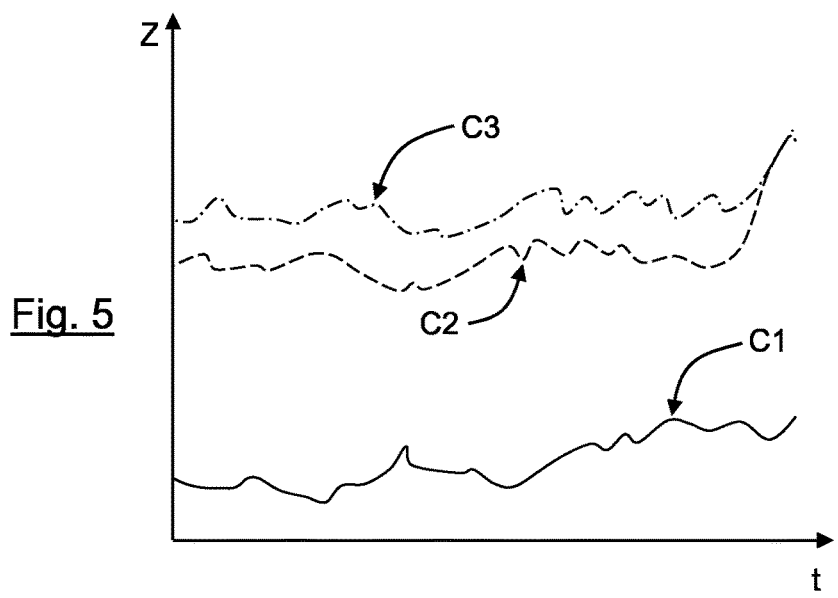
Fig. 5
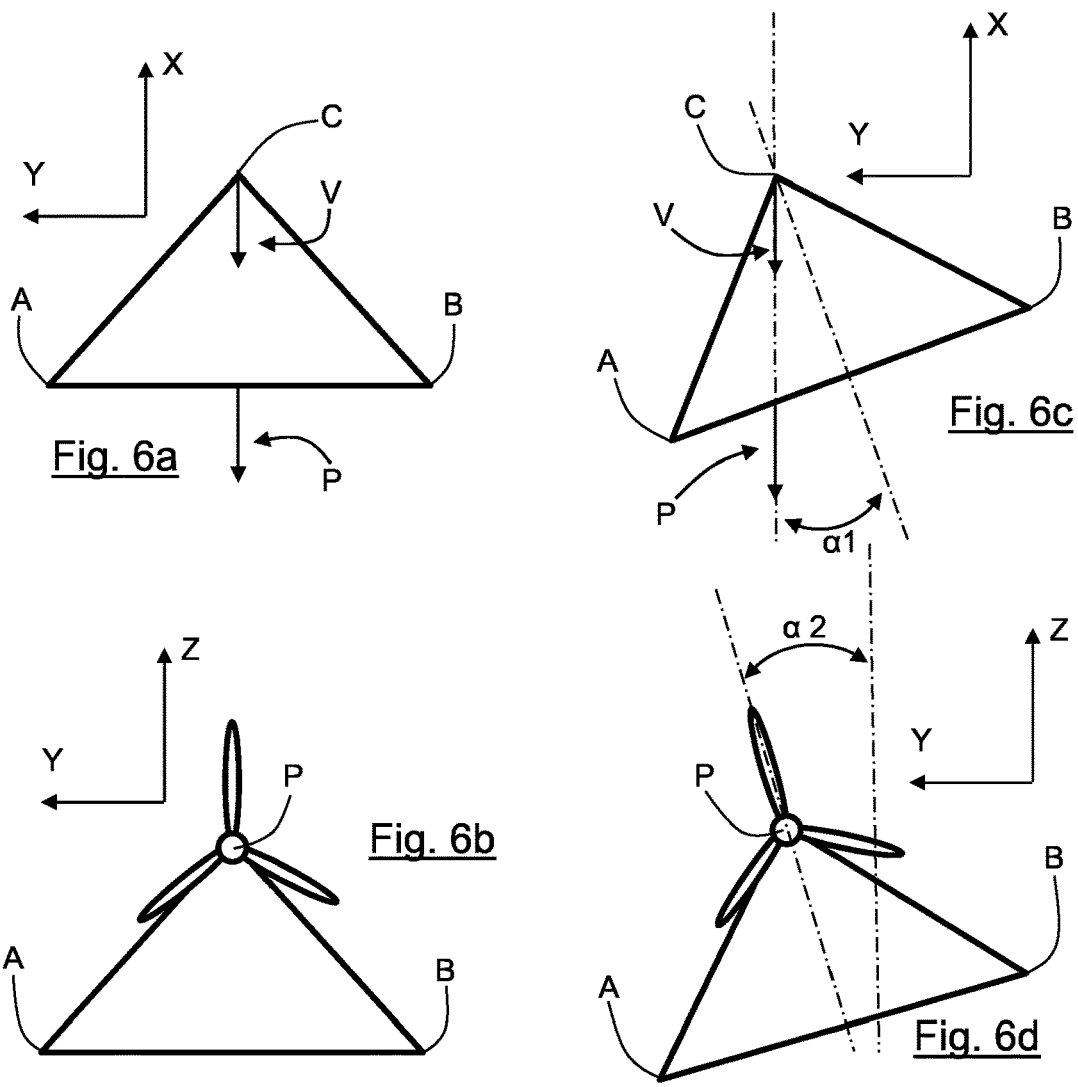
Fig. 6a
Fig. 6b
Fig. 6c
Fig. 6d

FLOATING WIND TURBINE WITH CONTROLLABLE YAW POSITION

The field of the invention is the design and manufacture of marine energy production means.

More specifically, the invention relates to a marine energy production assembly comprising a self-orientating wind turbine, in other words one which can move as a function of wind direction.

Wind turbines, which use wind power, are currently used for renewable energy production.

In a conventional design, wind turbines consist of a mast on which a turbine is mounted, which is provided with a rotor and a unit for transforming the movement of the rotor into an electrical current.

Wind turbines are generally set up in cultivated fields or in dedicated spaces, in the form of wind farms.

However, wind turbines have numerous drawbacks for locals living close to them.

First, wind turbines generate noise during operation. This noise is particularly disruptive when wind turbines are operating at night while the locals wish to sleep.

Moreover, although efforts have been made to make them aesthetically pleasing, wind turbines form a significant bulk which spoils the countryside.

In addition, the space required for setting up an onshore wind turbine is significant. It may thus be impossible to set up an onshore wind turbine in some locations, or a limit may be placed on the number of onshore wind turbines to be set up, reducing the electrical production capacity.

Finally, wind conditions may not be optimal on shore. By contrast, it has been shown that winds are stronger and more regular at sea, and this is beneficial for electricity production.

To limit the inconvenience to locals and to improve electrical production capacities, wind turbines for setting up at sea have been designed.

There are a plurality of types of offshore wind turbines.

The first type involves conventional offshore wind turbines, in other words wind turbines like those set up on shore but slightly modified so as to be able to be set up at sea.

Since wind direction can change, this first type of offshore wind turbine comprises a turbine mounted movably on the mast so as to adapt to the wind direction.

However, the turbine forms a significant weight at the top of the wind turbine, and this leads to a considerable lever arm and brings about significant tilting forces. It is therefore necessary to provide a structure for anchoring the wind turbine, which has to resist the forces associated with the wind and with the weight of the turbine.

Even nowadays, the majority of offshore wind turbines are based on the seabed, with the exception of some floating wind turbine prototypes of the second and third types described below. The mast of the offshore wind turbines therefore most commonly rests on a metal tube buried deep in the sea floor, and more rarely on a latticed metal structure known as a jacket.

Offshore wind turbines of this first type are thus generally very heavy, and the installation thereof, including the anchoring structure, can be long and tedious.

Floating offshore wind turbines make it possible to exploit vast swathes of the sea. By contrast with the aforementioned fixed offshore wind turbines, floating wind turbines can be installed beyond 50 m depth, and the assembly between the turbine and the foundations can advantageously be carried out on land and not at sea, where the conditions are more difficult.

Floating wind turbines are kept at the production site thereof using anchoring systems.

These anchoring systems of the wind turbine have to resist both normal and extreme conditions. They are generally formed from anchors (drag anchors, suction anchors, embedded plates, or even dead weight), anchoring lines (made of chain, metal cable, synthetic materials such as polyester, high-density polyethylene, or even polyamide).

A second type involves wind turbines similar to the first type but carried by a floating structure linked to the seabed. In production, wind turbines of the second type are subjected to currents and to swells, which can bring about a yaw angle at the wind turbine, in other words rotation of the floating wind turbine about a vertical axis.

To combat this yaw angle, floating wind turbines of the second type comprise an electrical yaw regulation system. For example, electric motors or a wind drift system make it possible to turn the turbine with respect to the mast so as to position the axis of rotation of the rotor of the turbine coaxial with the wind.

To improve the structural resistance of floating wind turbines, patent specification EP 2 986 848 describes a third type of floating wind turbine comprising a floating structure which carries a horizontal-axis wind turbine using a plurality of arms. The nacelle of the turbine is fixed with respect to the floating structure of the floating wind turbine, in such a way that it can no longer orientate itself towards the wind independently of the floating structure so as to compensate the yaw angle due to the forces from the sea. In short, the entirety of the floating wind turbine orientates itself towards the wind, by turning around an anchoring means such as a buoy or a drum.

This third type therefore involves self-orientating offshore wind turbines.

These wind turbines are generally smaller and lighter than those of the first and second types.

In particular, an object of the invention is to overcome the drawbacks of the prior art.

More specifically, an object of the invention is to propose a marine energy production assembly which makes it possible to counteract the forces from the sea and wind so as to stabilise the wind turbine so as to provide good orientation of the turbine and to guarantee a high production yield of the wind turbine.

A further object of the invention is to provide an assembly of this type which is simple to operate and autonomous.

These objects, as well as others which will become apparent, are achieved by the invention, which relates to a marine energy production assembly comprising:
  anchoring means for fixing to a seabed;
  a floating wind turbine comprising a turbine having a fixed axis of rotation of a rotor with respect to a floating structure of the floating wind turbine, the floating wind turbine being linked to the anchoring means and being intended to pivot around them in such a way that the axis of rotation of the turbine is substantially parallel to a wind direction,
  means for determining the wind direction;
characterised in that it comprises:
  means for detecting an orientation of the floating wind turbine with respect to the wind direction;
  means for detecting an inclination of the floating wind turbine about an axis parallel to the axis of rotation of the rotor of the turbine;
  means for controlling the inclination of the floating wind turbine;

a computation unit for receiving information from the means for detecting the wind direction, means for detecting the inclination of the floating wind turbine, and means for detecting the orientation of the floating wind turbine with respect to the wind direction, so as to transmit an instruction to the means for controlling the inclination of the floating wind turbine and alter the orientation of the floating wind turbine with respect to the wind direction.

By controlling the inclination of the floating wind turbine, a better electricity production yield of the floating wind turbine can be guaranteed.

Moreover, wear and thus premature breakage or damage of the floating wind turbine are reduced or even eliminated.

In addition, the inclination of the floating wind turbine is altered by altering the roll angle thereof, in other words altering the inclination of the floating wind turbine about the fixed axis of rotation of the rotor. In a cause-and-effect relationship, altering the roll angle of the floating wind turbine makes it possible to act and to alter the yaw angle thereof, in other words the orientation thereof about an axis substantially perpendicular to the surface of the sea and to the axis of rotation of the rotor of the turbine.

Specifically, the position of the centre of effort (close to the centre of the rotor of the turbine) defined by the tilt of the blades is altered when the roll angle is altered. This has the effect of altering the position of the wind turbine and in particular the yaw angle thereof with respect to the wind direction. Therefore, the electrical energy production is improved when the sea conditions would be unfavourable for exploiting a wind turbine.

In other words, to alter the yaw angle, instead of acting directly thereon, for example by playing with the tension of the moorings linking the floating wind turbine to the anchoring means, other parameters are acted on which are easier to alter and which place fewer constraints on the structure of the floating wind turbine.

In a first advantageous embodiment, the inclination control means comprise a ballast system having:
  a first reservoir and a second reservoir, which are each fixed with respect to a structure of the floating wind turbine, are fixed on either side of the axis of rotation of the turbine, and are suitable for acting on the inclination of the floating wind turbine;
  pumping means configured for conveying a liquid or semi-liquid weight from the first reservoir to the second reservoir or vice versa.

The use of reservoirs to form ballasts makes it possible to alter the orientation of the floating wind turbine rapidly.

Moreover, pumping and discarding water directly the sea and/or from one ballast to the other means that the alteration to the orientation of the floating wind turbine is rapid, further increasing the yield thereof.

In a second advantageous embodiment, the inclination control means comprise:
  a mass mounted movably on a structure of the floating wind turbine;
  means for guiding the displacement of the mass, defining a guide path extending on either side of the axis of rotation of the turbine;
  motor means for displacing the mass on the guide means.

Control means of this type are advantageously quick to implement, since a simple displacement of the mass to one or other side of the floating wind turbine changes the inclination thereof. Moreover, by using predetermined guide means, it is possible to alter the inclination of the floating wind turbine very finely.

In a third embodiment, the inclination control means comprise turbine torque adjustment means for varying the torque of the turbine as a function of an instruction from the computation unit.

By controlling the torque of the turbine, it is possible to alter the roll inclination of the floating wind turbine as a function of the forces due to the wind. In other words, with a strong wind and thus a large inclination, adjusting the turbine torque (torque reduction) to limit the effects of the wind on the inclination of the floating wind turbine makes it possible to maintain a constant electrical production power (this also being referred to as iso-power).

Advantageously, the means for determining the wind direction comprise a vane.

A vane is simple to implement and install, and is also found to be relatively precise for allowing good orientation of the floating wind turbine.

In a first variant embodiment, the vane is fixed with respect to the floating wind turbine.

In a second variant embodiment, the vane is fixed with respect to the anchoring means.

It is thus possible to position the vane either on the anchoring means or on the floating wind turbine without this influencing the quality of the orientation of the floating wind turbine. Thus, regardless of the placement thereof, the vane can provide reliable information which makes it possible to orientate the floating wind turbine correctly as a function of the wind direction.

Advantageously, the means for detecting the inclination of the floating wind turbine comprise an inertial unit fixed with respect to the floating wind turbine.

An inertial unit makes it possible to know the inclination of the floating wind turbine along a plurality of axes. In particular, this makes possible precise orientation of the floating wind turbine as a function of the wind direction, and thus a significant production yield.

The invention further relates to a process for altering the orientation of a floating wind turbine, carried out by a marine energy production assembly, characterised in that it comprises the steps of:
  determining the wind direction;
  detecting the orientation of the floating wind turbine with respect to the wind direction;
  defining an instruction to alter the inclination of the floating wind turbine on the basis of the wind direction and the orientation of the floating wind turbine;
  acting on the inclination of the floating wind turbine by way of said instruction to alter the inclination of the floating wind turbine.

Further features and advantages of the invention will become more clearly apparent upon reading the following description of a preferred embodiment of the invention, given by way of illustrative, non-limiting example, and the accompanying drawings, in which:

FIG. 5 is a diagram showing the development of the yaw angle in different usage scenarios of the floating wind turbine of the marine energy production assembly according to the invention during a testing programme;

FIGS. 6a to 6d are schematic illustrations of the floating wind turbine of the marine energy production assembly according to the invention, during the testing programme, in a top view in FIGS. 6a and 6c and a front view in FIGS. 6b and 6d.

FIG. 1 shows a marine energy production assembly 1 according to the invention.

Figure 1:
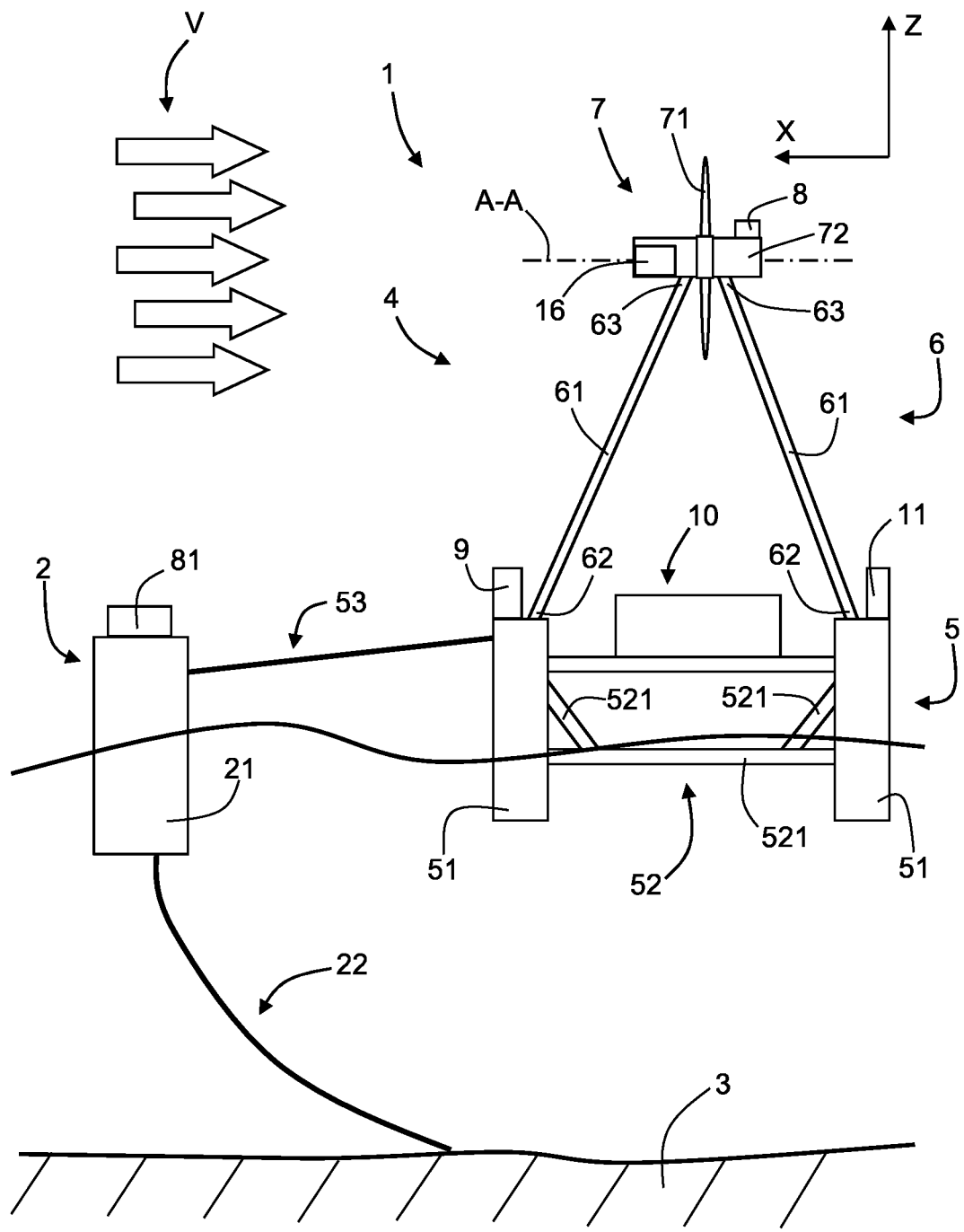
FIG. 1 is a schematic side view of a marine energy production assembly according to the invention.

The energy production assembly 1 comprises:
anchoring means 2 for fixing to a seabed 3;
a self-orientating floating wind turbine 4.

The anchoring means 2 comprise a buoy 21 and a device 22 for anchoring the buoy 21 to the seabed 3.

The floating wind turbine 4 comprises:
a floating structure 5;
an aerial structure 6 mounted on the floating structure 5;
a turbine 7 carried by the aerial structure 6.

The floating structure 5 comprises at least three floats 51, in the present case four floats 51.

The floats 51 are linked to one another via a lattice 52 formed of girders 521, for example metal girders 521.

The aerial structure 6 comprises four legs 61. Each leg 61 has a first end 62 fixed with respect to one of the floats 51 and a second end 63 fixed with respect to the turbine 7.

The turbine 7 comprises a rotor 71 and a nacelle 72 on which the rotor 71 is mounted in rotation about an axis of rotation A-A which is fixed with respect to the floating structure 5 of the floating wind turbine 4.

In general, the rotor 71 is formed of a central hub on which blades are mounted in rotation. The blades are mutually independent so as to be orientable in real time if necessary, in particular so as to vary the wind resistance of the rotor 71 and thus the torque of the turbine 7. For reasons of clarity, a rotor is referred to in the following rather than an assembly of a central hub and blades.

As is shown in FIG. 1, the turbine 7 is fixed to the aerial structure 6 by cooperation of the nacelle 72 with the second end 63 of the legs.

Finally, the floating wind turbine 4 is linked to the anchoring means 2 by joining means 53, and more particularly by at least one mooring.

The moorings make it possible for the floating wind turbine 4, during the operation thereof, to turn around the buoy 22 of the anchoring means 2 so as to position itself in a wind direction V (represented by arrows in FIG. 1). In the case of a single mooring, the centre of yaw rotation of the floating wind turbine 4 is the connection between the mooring and the floating wind turbine 4.

In other words, the buoy 2 forms an axis of rotation about which the floating wind turbine 4 turns to produce energy.

With respect to the floating wind turbine 4, an orthonormal coordinate system is defined so as to comprise:
an X-axis parallel to the axis of rotation A-A;
a Y-axis perpendicular to the X-axis and extending in a port-starboard direction of the floating wind turbine 4;
a Z-axis forming a right trihedron or orthonormal coordinate system with the X- and Y-axes.

Relative to this orthonormal coordinate system, three angles of rotation are defined, namely a roll angle about the X-axis, a pitch angle about the Y-axis, and a yaw angle about the Z-axis.

During energy production, the floating wind turbine 4 is subjected to external forces which tend to destabilise and incline it.

Among these external forces, the current and the swell bring about disorientation of the floating wind turbine 4 which impairs the electrical energy productivity.

Moreover, when the wind exerts a thrust on the turbine, the wind turbine has a tendency to pitch, in other words to pivot about the Y-axis.

When the swell is aligned with the wind V, it influences the pitch of the wind turbine in an alternating, cyclical manner. This means that, with the crests and troughs of the wind, the floating wind turbine is displaced and then returns to position cyclically.

When the swell is perpendicular to the wind, the first-order forces (the most significant ones), in other words in general the main components of the forces, generate an alternating, cyclical roll.

Since the roll forces about the Y-axis average to zero at the first order (the displacement (on a crest) being cancelled by the return to position (in a trough)), they do not push the floating wind turbine 4 about the Y-axis, nor do they alter the yaw angle of the floating wind turbine 4 with respect to the wind turbine.

The second-order forces (considered in detail) potentially generate a drift force on the floating wind turbine 4, in the form of a yaw angle.

By contrast, a current about the Y axis may be harmful, especially if the current is strong. This is explained in particular by the drag generated by the current on the floating structure 5 of the floating wind turbine 4.

Specifically, the floating wind turbine 4 is then positioned off-axis, impairing the electrical energy production yield thereof.

To reduce the influence of the swell and the current on the productivity of the floating wind turbine 4, the invention aims to alter the position of the centre of effort P. The centre of effort P of the floating wind turbine 4 is defined as the barycentre of the sum of all the forces associated with the wind V which are applied to the aerial structure 6 (principally to the rotor 71).

As the centre of effort P is altered, the floating wind turbine 4 is displaced about the Y axis, and a yaw angle $\alpha 1$ is generated.

One of the reasons behind this mechanism is that the wind vector V passing through a centre of yaw rotation of the floating wind turbine 4 (for example the anchoring means) has to be collinear with the wind thrust force P.

This yaw angle $\alpha 1$ makes it possible to correct misalignment with the wind V or to create misalignment with the wind V if it is desired to orientate the slipstream of the floating wind turbine 4 in a specific direction (for example to prevent it from being directed towards another floating wind turbine 4 positioned downstream, disrupting the yield thereof).

In other words, an acceptable yaw angle $\alpha 1$ is intentionally created so as to prevent disturbance to the operation of an adjacent floating wind turbine 4 located downstream in the flow direction of the wind V.

Acceptable is understood to means that the yaw angle $\alpha 1$ created does not impair the production yield of the intentionally off-axis floating wind turbine 4.

Figure 2:
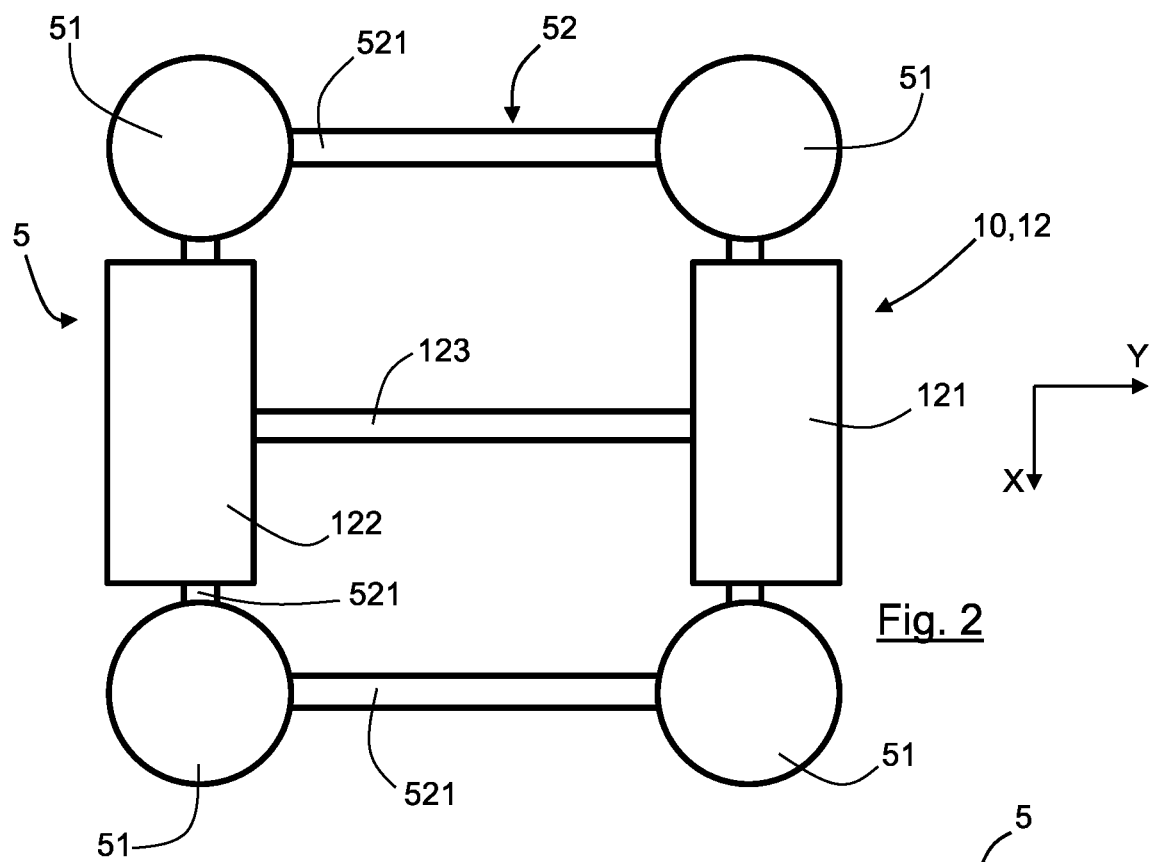
FIG. 2 is a schematic top view of a structure of a floating wind turbine of the marine energy production assembly according to the invention in a first embodiment.
Figure 3:
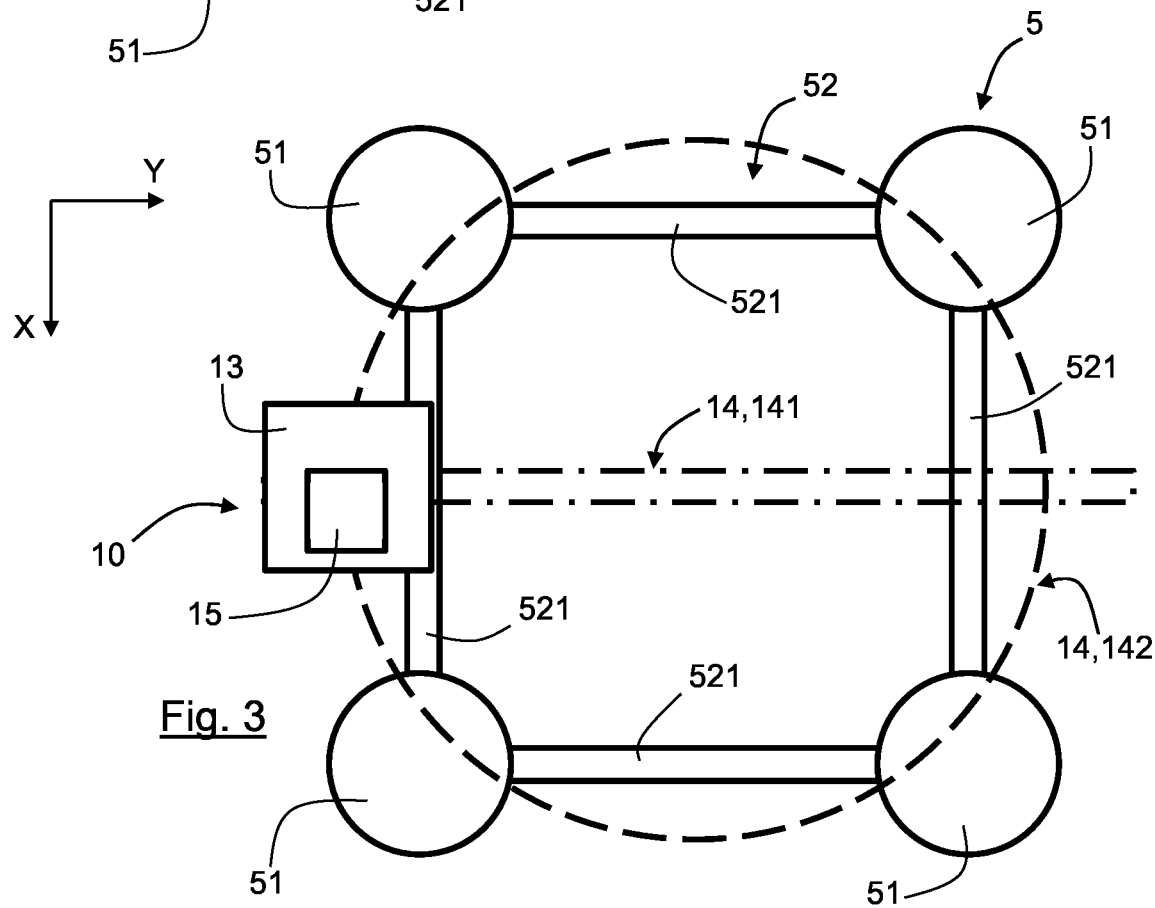
FIG. 3 is a schematic top view of a structure of a floating wind turbine of the marine energy production assembly according to the invention in a second embodiment.

To make it possible to correct or create the yaw angle $\alpha 1$, and thus to make a good production yield of the floating wind turbine 4 possible, the production assembly 1 comprises:
means 8 for determining the wind direction V;
means 81 for detecting an orientation of the wind turbine with respect to the wind direction;

means 9 for detecting an inclination of the floating wind turbine 4;

means 10 for controlling the inclination of the floating wind turbine, shown schematically in FIGS. 2 and 3;

a computation unit 11 which communicates with the determination means 8, the detection means 9 and the control means 10.

The means 8 for determining the wind direction V are for example in the form of a vane, and the means for determining the orientation of the floating wind turbine 4 with respect to the wind direction V are for example in the form of a camera orientated in the direction of the wind V and intended to capture the position of a coordinate system.

By way of example, the camera is fixed with respect to the mooring means and the coordinate system is fixed with respect to the floating wind turbine 4.

Figure 4:
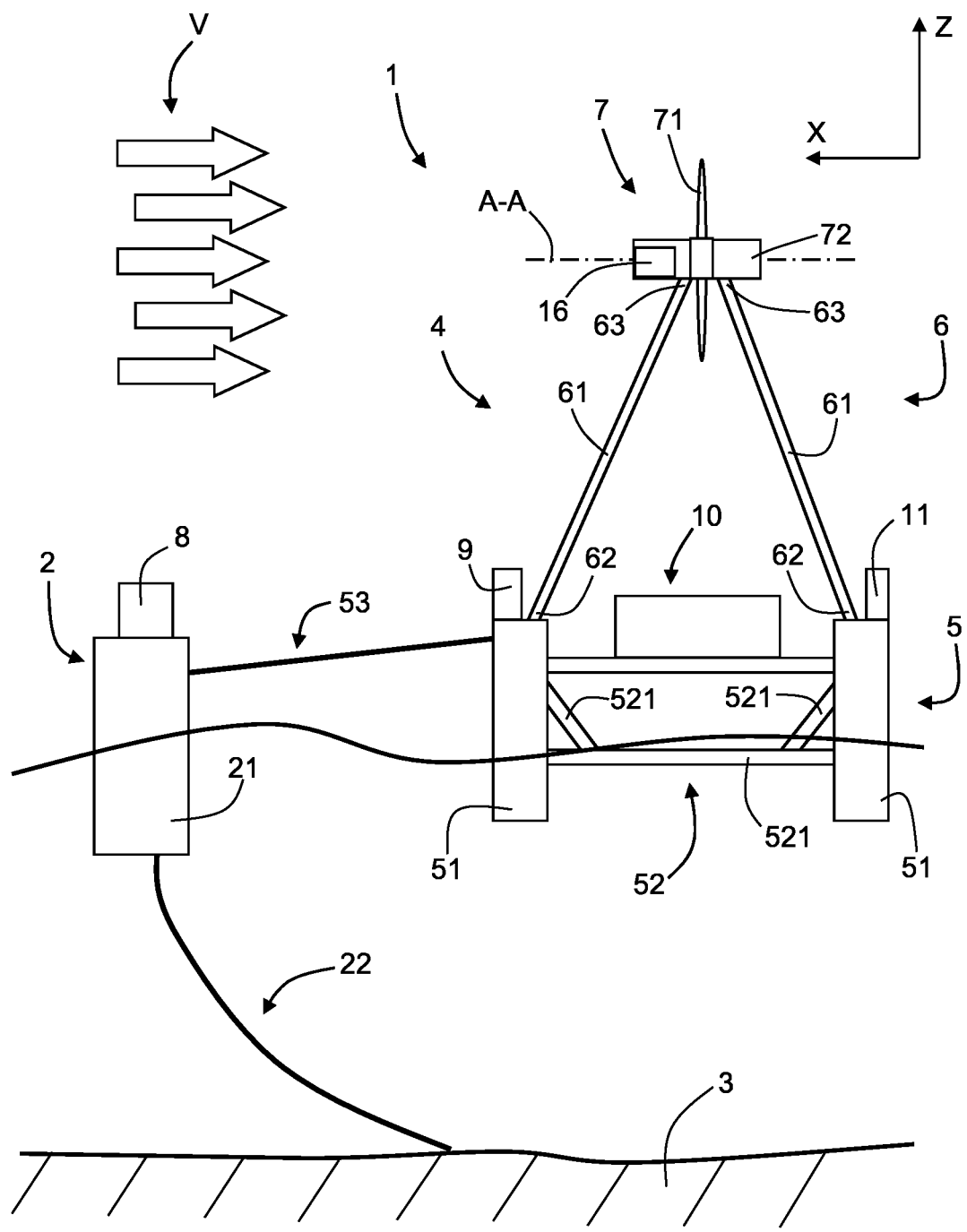
FIG. 4 is a schematic side view of a marine energy production assembly according to the invention in a variant embodiment.

The means 8 for determining the wind direction V may be mounted on the floating wind turbine 4, as shown in FIG. 1, or on the mooring means 2 and more particularly on the buoy 21, as shown in FIG. 4.

The means 9 for detecting the inclination of the floating wind turbine 4 are for example in the form of a compass or accelerometer, and are positioned on the floating wind turbine 4. Preferably, the means 9 for detecting the inclination of the floating wind turbine are in the form of an inertial unit.

The computation unit 11 is intended to acquire information from the means 8 for determining the wind direction and the means 9 for detecting the inclination of the floating wind turbine 4, so as to transmit an instruction to the means 10 for controlling the inclination of the floating wind turbine 4.

In a first embodiment, shown in FIG. 2, the means 10 for controlling the inclination of the floating wind turbine 4 comprise a ballast system 12 having:

a first reservoir 121 and a second reservoir 122;

pumping means 123.

More specifically, the first reservoir 121 and the second reservoir 122 are each fixed with respect to the structure 5 of the floating wind turbine 4 and are arranged either side of the axis of rotation A-A of the turbine 7.

When one of the first reservoir 121 and the second reservoir 122 is filled with a larger amount than the other, it can act on the inclination of the floating wind turbine 4 and in particular on the roll angle, in other words pivoting the floating wind turbine 4 about the X-axis.

By contrast, when no force is acting to alter the inclination of the wind turbine 4, the first reservoir 121 and the second reservoir 122 may each be filled or else each be emptied. Each reservoir thus has the same mass as the other, in such a way that the floating wind turbine 4 is stabilised automatically.

The pumping means 123 are configured for conveying a liquid or semi-liquid weight from the first reservoir 121 to the second reservoir 122 or vice versa.

Preferably, the weight is water pumped directly from the sea by the pumping means 123. The pumping means 123 are further configured to make it possible to discard the water contained in each of the first reservoir 121 and the second reservoir 122 so as to make it possible to empty them completely.

In addition, the pumping means are controlled by the computation unit 11 as described below.

In a second embodiment, shown in FIG. 3, the means 10 for controlling the inclination of the floating wind turbine 4 comprise:

a mass 13;

means 14 for guiding the displacement of the mass 13;

motor means 15.

The mass 13 is mounted movably on the structure 5 of the floating wind turbine 4.

More specifically, the mass 13 is mounted movably on the means 14 for guiding the displacement of the mass 13, which are in turn fixed with respect to the structure 5 of the floating wind turbine.

The guide means 14 define a guide path extending on either side of the axis of rotation A-A of the turbine 7.

In a first embodiment, the guide means 14 take the form of a straight rail 141 extending substantially perpendicular to the axis of rotation A-A of the turbine 7. The mass 13 can therefore be displaced on this straight rail 141 so as to go from left (port) to right (starboard) or vice versa.

In a second embodiment, the guide means 14 are in the form of a circular rail 142, the central point of which is located on a vertical axis passing through a centre of gravity of the structure 5 of the floating wind turbine 4, in such a way that, in the absence of the mass 13, the circular rail 142 does not by itself influence the inclination of the floating wind turbine 4.

The mass 13 can therefore be displaced on this circular rail 142 to go from left (port) to right (starboard) or vice versa.

To make it possible for the mass 13 to be displaced on the guide means 14, the motor means 15, for example a motor coupled to one or more wheels, are mounted fixed with respect to the mass 13.

Each wheel of the motor means 15 is thus intended to cooperate with the guide means 14 by friction or by meshing, for example. In the case of cooperation by meshing, each wheel of the motor means 15 is a toothed wheel, and the guide means 14 comprise either a toothed line (for the straight rail 141) or a toothed crown (for the circular rail 142).

When the motor means 15 are actuated, they provide the displacement of the mass 13 along the guide means 14.

The motor means 15 are controlled by the calculation unit 11 so as to be actuated.

In a third embodiment, shown in FIGS. 1 and 4, the means 10 for controlling the inclination comprise means 16 for adjusting the torque of the turbine 7.

More specifically, the means 16 for adjusting the torque of the turbine 7 are positioned in the nacelle 72 of the turbine 7, and act, for example via a transmission, on the rotational speed of the rotor 71, so as to vary the torque of the turbine 7 as a function of an instruction from the computation unit 11.

During operation, the calculator 11 receives information from means 8 for determining the wind direction and means 9 for detecting the inclination of the floating wind turbine 4, so as to combine said information and determine an instruction for controlling the inclination of the floating wind turbine 4.

The calculation unit 11 then transmits the control signal to the control means 10 using ad hoc means, the control means then acting directly on the inclination of the floating wind turbine by:

filling or emptying one or both of the first reservoir 121 and second reservoir (FIG. 2);

displacing the mass 13 on the guide means 14 (FIG. 3), and/or adjusting the torque of the turbine 7 (FIG. 4).

Although this is not shown in the drawings, the floating wind turbine 4 could comprise a plurality of different control means 10. Specifically, it is possible to combine at least two, or even all three, of the above-mentioned embodiments.

For example, the floating wind turbine 4 could comprise first control means 10 in the form of ballasts (FIG. 2) and/or second control means 10 in the form of displacement of a mass (13) on the floating structure 5 (FIG. 3) and/or third control means 10 in the form of means 16 for adjusting the motor torque (FIG. 4).

Referring to FIG. 5, experimental tests were carried out where the exploitation conditions of the wind turbine represent a rare situation which obstructs the operation of the floating wind turbine, for example a swell during a storm.

These tests aim in particular to study the behaviour of the floating wind turbine 4 when the roll angle (rotation of the floating wind turbine 4 about the X-axis in FIGS. 1 to 4) is altered.

The behaviour of the floating wind turbine 4 is shown schematically in FIGS. 6a to 6d.

In FIGS. 6a and 6c the floating wind turbine 4 is schematically represented by a straight line extending between a point A and a point B, and in FIGS. 6b and 6d the floating wind turbine 4 is in a front view. The point C in FIGS. 6a and 6c represents the centre of rotation of the floating wind turbine 4.

In FIG. 6a, the floating wind turbine 4 is sketched in an optimum operating configuration; in other words, no storm or current is being applied to the floating wind turbine 4. Thus, the vector of the wind direction V and the wind thrust P are aligned, and no yaw angle is generated.

For each test, represented by one of the lines C1 to C3 on the graph of FIG. 5, the development conditions of the floating wind turbine 4 are the same, namely with a very significant storm (a scenario not representative of general normal production conditions) being produced at 90° to the wind direction V.

Line C1 shows that in these conditions, without control of the roll angle α2, the floating wind turbine 4 has a yaw angle of approximately 30°. The floating wind turbine 4 is thus substantially parallel to the surface of the water (meaning that the segment AB is horizontal in FIG. 6b).

In these development conditions, the wind direction V and the wind thrust P are no longer aligned.

By modifying the centre of effort P using the control means 10, the floating wind turbine 4 is displaced about the Y-axis and the yaw angle α1 is generated (FIG. 6c).

One of the reasons for this mechanism is as follows: the vector of the wind direction V passing through a centre of yaw rotation of the floating wind turbine 4 (for example the anchoring means) has to be collinear with the wind thrust force P.

This intentionally created yaw angle α1 thus makes it possible to correct the misalignment with the wind V, increasing the production yield of the floating wind turbine 4.

Line C2 represents the floating wind turbine 4 in these same conditions except that a weight is added at point A of the floating structure 4 by the control means 10 (the addition of weight being sketched in FIG. 6d). It is then found that the yaw angle α1 is between 5° and 10°.

Finally, line C3 shows the floating wind turbine 4 still in the same conditions except that a weight twice as great as for line C2 is added at point 1 of the floating structure 4. It is then found that the yaw angle is between 0° and 5°.

These tests thus make it possible to verify that the yaw angle α1 can be controlled by one of the means 10 for controlling the inclination of the floating wind turbine 4 which were described above, these control means 10 thus influencing the roll angle α2 of the floating wind turbine 4.

The invention claimed is:

1. Marine energy production assembly (1) comprising:
anchoring means (2) for fixing to a seabed (3);
a floating wind turbine (4) comprising a turbine (7) having a fixed axis of rotation (A-A) of a rotor (71) with respect to a floating structure (5) of the floating wind turbine (4), the floating wind turbine (4) being linked to the anchoring means (2) and being intended to pivot around them in such a way that the axis of rotation (A-A) of the turbine (7) is substantially parallel to a wind direction (V),
means (8) for determining the wind direction (V);
characterised in that it comprises:
means (81) for detecting an orientation of the floating wind turbine (4) with respect to the wind direction (V);
means (9) for detecting an inclination of the floating wind turbine (4) about an axis parallel to the axis of rotation (A-A) of the rotor (71) of the turbine (7);
means (10) for controlling the inclination of the floating wind turbine (4);
a computation unit (11) for receiving information from the means (8) for detecting the wind direction (V), means (9) for detecting the inclination of the floating wind turbine (4), and means (81) for detecting the orientation of the floating wind turbine (4) with respect to the wind direction (V), so as to transmit an instruction to the means (10) for controlling the inclination of the floating wind turbine (4) and alter the orientation of the floating wind turbine (4) with respect to the wind direction (V).

2. Assembly according to claim 1, characterised in that the means (10) for controlling the inclination comprise a ballast system having:
a first reservoir (121) and a second reservoir (122), which are each fixed with respect to a floating structure (5) of the floating wind turbine (4), are fixed on either side of the axis of rotation (A-A) of the turbine (7), and are suitable for acting on the inclination of the floating wind turbine (4);
pumping means (123) configured for conveying a liquid or semi-liquid weight from the first reservoir (121) to the second reservoir (122) or vice versa.

3. Assembly according to claim 1, characterised in that the means (10) for controlling the inclination comprise:
a mass (13) mounted movably on a floating structure (5) of the floating wind turbine (4);
means (14) for guiding the displacement of the mass (13), defining a guide path extending on either side of the axis of rotation (A-A) of the turbine (7);
motor means (15) for displacing the mass (13) on the guide means (14).

4. Assembly according to claim 1, characterised in that the means (10) for controlling the inclination comprise means (16) for adjusting the torque of the turbine (7) to vary the torque of the turbine (7) as a function of an instruction from a computation unit (11).

5. Assembly according to claim 1, characterised in that the means (8) for determining the wind direction comprise a vane.

6. Assembly according to claim 5, characterised in that the vane is fixed with respect to the floating wind turbine (4).

7. Assembly according to claim 6, characterised in that the vane is fixed with respect to the anchoring means (2).

8. Assembly according to claim 1, characterised in that the means (9) for detecting the inclination of the floating wind turbine (4) comprise an inertial unit fixed with respect to the floating wind turbine (4).

9. Process for altering the orientation of a floating wind turbine (4), carried out by a marine energy production assembly (1) according to claim 1, characterised in that it comprises the steps of:
- determining the wind direction (V);
- detecting the orientation of the floating wind turbine (4) with respect to the wind direction (V);
- generating an instruction to alter the roll angle on the basis of the wind direction (V) and the orientation of the floating wind turbine (4);
- changing the roll angle of the floating wind turbine (4) responsive to the instruction.

10. A marine energy production apparatus comprising:
- a floating structure;
- a floating wind turbine assembly including a floating structure, a support structure including a plurality of legs, each leg having a first end fixed to said floating structure and a second end, a turbine comprising a nacelle and a motor mounted on the nacelle, the rotor having an axis of rotation that is fixed with respect to said floating structure and is substantially parallel to a wind direction;
- means for detecting the wind direction;
- means for detecting an orientation of said floating wind turbine with respect to the wind direction;
- means for detecting an inclination of said floating wind turbine about an axis parallel to the axis of rotation the rotor;
- means for controlling the inclination of said floating wind turbine with respect to the axis parallel to the axis of rotation of the rotor;
- a computation unit for receiving information from said means for detecting the wind direction, said means for detecting the inclination of the floating wind turbine, and said means for detecting the orientation of the floating wind turbine, and generating an instruction for controlling the inclination of said floating wind turbine, said means for controlling altering the inclination of said floating wind turbine responsive to said instruction.

11. The marine energy production apparatus of claim 10 wherein said means for controlling the inclination of said floating wind turbine includes a ballast system having first and second reservoirs disposed on either side of the axis of rotation of the rotor.

12. The marine energy production apparatus of claim 10 wherein said means for controlling the inclination of said floating wind turbine includes a guide path extending on either side of the axis of rotation of the turbine and a mass movably mounted on said guide path.

13. The marine energy production apparatus of claim 12 wherein the guide path includes is a straight rail extending substantially perpendicular to the axis of rotation of the rotor.

14. The marine energy production apparatus of claim 12 wherein the guide path is a circular rail having a center point disposed on a vertical axis that passes through a center of gravity of said floating structure.

* * * * *